US011990150B2

(12) United States Patent
Xu

(10) Patent No.: US 11,990,150 B2
(45) Date of Patent: May 21, 2024

(54) METHOD AND DEVICE FOR AUDIO REPAIR AND READABLE STORAGE MEDIUM

(71) Applicant: Tencent Music Entertainment Technology (Shenzhen) Co., Ltd., Guangdong (CN)

(72) Inventor: Dong Xu, Guangdong (CN)

(73) Assignee: Tencent Music Entertainment Technology (Shenzhen) Co., Ltd., Guangdong (CN)

( * ) Notice: Subject to any disclaimer, the term of this patent is extended or adjusted under 35 U.S.C. 154(b) by 165 days.

(21) Appl. No.: 17/627,103

(22) PCT Filed: Jun. 28, 2019

(86) PCT No.: PCT/CN2019/093719
§ 371 (c)(1),
(2) Date: Jan. 13, 2022

(87) PCT Pub. No.: WO2020/228107
PCT Pub. Date: Nov. 19, 2020

(65) Prior Publication Data
US 2022/0254365 A1 Aug. 11, 2022

(30) Foreign Application Priority Data
May 13, 2019 (CN) ........................ 201910397254.4

(51) Int. Cl.
*G10L 21/0264* (2013.01)
*G10L 21/0208* (2013.01)
(Continued)

(52) U.S. Cl.
CPC ...... *G10L 21/0264* (2013.01); *G10L 21/0208* (2013.01); *G10L 21/0216* (2013.01);
(Continued)

(58) Field of Classification Search
CPC ................ G10L 21/02; G10L 21/0208; G10L 2021/02087; G10L 21/0216; G10L 21/0264; G10L 21/0224
See application file for complete search history.

(56) References Cited

U.S. PATENT DOCUMENTS 7,058,572 B1 * 6/2006 Nemer ................ G10L 21/0208 704/226
2006/0009970 A1 * 1/2006 Harton .................... B63C 11/26 704/231

(Continued)

FOREIGN PATENT DOCUMENTS

CN 107346665 A 11/2017
CN 108449497 A 8/2018

(Continued)

OTHER PUBLICATIONS

CNIPA, International Search Report (with English translation) for International Patent Application No. PCT/CN2019/093719, dated Feb. 6, 2020, 6 pages.

(Continued)

*Primary Examiner* — Samuel G Neway
(74) *Attorney, Agent, or Firm* — IP Spring

(57) ABSTRACT

A method and a device for audio repair and a readable storage medium are provided. The method includes the following. Multiple audio frames are sequentially inputted into a cache module, where the cache module is sequentially composed of multiple processing units, and a processing unit located at a center of the multiple processing units is a center processing unit (201). At least one audio frame contained in the center processing unit is assigned as a target frame (202). A noise point presented as a short-term high-energy pulse in the target frame is detected according to audio characteristics of the multiple audio frames in the (Continued)

cache module (203). The target frame is repaired to remove the noise point in the target frame (204).

14 Claims, 4 Drawing Sheets

(51) Int. Cl.
*G10L 21/0216* (2013.01)
*G10L 21/0224* (2013.01)
*G10L 21/0232* (2013.01)

(52) U.S. Cl.
CPC ...... *G10L 21/0224* (2013.01); *G10L 21/0232* (2013.01); *G10L 2021/02087* (2013.01); *G10L 2021/02163* (2013.01)

(56) References Cited

U.S. PATENT DOCUMENTS

2009/0086987 A1* 4/2009 Wihardja ............ G10L 21/0208
381/71.1
2012/0140103 A1* 6/2012 Kimura ................... G10L 21/02
348/335
2014/0350923 A1* 11/2014 Wu ......................... G10L 25/84
704/226
2015/0071463 A1* 3/2015 Niemisto ............ G10L 21/0224
381/94.5
2015/0170667 A1* 6/2015 Wu ..................... G10L 21/0232
381/94.2
2016/0196833 A1* 7/2016 Godsill ............... G10L 21/0208
704/226
2016/0198030 A1* 7/2016 Kim ........................ H04M 1/19
379/392.01
2016/0260442 A1* 9/2016 Hsu ..................... G10L 21/0216
2018/0301157 A1* 10/2018 Gunawan ............ G10L 21/0208
2022/0254365 A1* 8/2022 Xu ...................... G10L 21/0224

FOREIGN PATENT DOCUMENTS

CN 109087632 A 12/2018
CN 109545246 A 3/2019

OTHER PUBLICATIONS

CNIPA, Written Opinion (with English translation) for International Patent Application No. PCT/CN2019/093719, dated Feb. 6, 2020, 6 pages.

* cited by examiner

METHOD AND DEVICE FOR AUDIO REPAIR AND READABLE STORAGE MEDIUM

CROSS-REFERENCE TO RELATED APPLICATIONS

This application is the U.S. National Stage filing under 35 U.S.C. § 371 of International Patent Application No. PCT/CN2019/093719, filed on Jun. 28, 2019, which in turn claims priority under PCT Article 8 and/or 35 U.S.C. § 119(a) to Chinese Patent Application No. 201910397254.4, filed on May 13, 2019, which is incorporated herein by reference in its entirety.

TECHNICAL FIELD

This application relates to the field of signal processing, and in particular to a method and a device for audio repair and a readable storage medium.

BACKGROUND

Due to influence of interfering signals, a kind of noise sounding like "click" is often generated in an audio. This kind of noise is actually a short-term high-energy pulse existing in the audio, with high energy and small duration.

At present, there is no desirable detection and repair method for this kind of noise presented as the short-term high-energy pulse in the audio.

SUMMARY

Embodiments of the present application provide a method for audio repair, which can detect and repair a noise point presented as a short-term high-energy pulse in an audio.

In a first aspect, embodiments of the present application provide a method for audio repair. The method includes the following.

Multiple audio frames are sequentially inputted into a cache module, where the cache module is sequentially composed of multiple processing units, and a processing unit located at a center of the multiple processing units is a center processing unit. At least one audio frame contained in the center processing unit is assigned as a target frame. A noise point presented as a short-term high-energy pulse in the target frame is detected according to audio characteristics of the multiple audio frames in the cache module. The target frame is repaired to remove the noise point in the target frame.

In a second aspect, embodiments of the present application provide a device for audio repair. The device for audio repair includes units for performing the method for audio repair of the first aspect. The device for audio repair includes an input unit, an obtaining unit, a detecting unit, and a repairing unit.

The input unit is configured to input sequentially multiple audio frames into a cache module, where the cache module is sequentially composed of multiple processing units, and a processing unit located at a center of the multiple processing units is a center processing unit.

The obtaining unit is configured to assign at least one audio frame contained in the center processing unit as a target frame.

The detecting unit is configured to detect a noise point presented as a short-term high-energy pulse in the target frame according to audio characteristics of the multiple audio frames in the cache module.

The repairing unit is configured to repair the target frame to remove the noise point in the target frame.

In a third aspect, embodiments of the present application provide a device for audio repair. The device includes a processor, a communication interface, an input device, an output device, and a memory. The processor, the communication interface, the input device, the output device, and the memory are coupled to each other. The memory is configured to store a computer program including program instructions. The processor is configured to invoke the program instructions to carry out the method of the first aspect.

In a fourth aspect, embodiments of the present application provide a computer-readable storage medium. The computer-readable storage medium stores a computer program, and the computer program includes program instructions which, when executed by a processor, cause the processor to carry out the method of the first aspect.

In the present application, multiple audio frames are sequentially inputted into the cache module. The audio frame(s) contained in the center processing unit in the cache module is then assigned as the target frame. The noise point in the target frame is determined according to the audio characteristics of the multiple audio frames in the cache module. At last, the target frame is repaired. As can be seen, the present application has at least the following innovations. Firstly, the present application can detect and repair the noise point in each audio frame exhaustively and accurately by inputting sequentially multiple audio frames into the cache module and processing successively the audio frame in the center processing unit in the cache module. Secondly, the present application can detect the noise point in the target frame accurately by comparing the audio characteristics of the target frame and the audio characteristics of the audio frame adjacent to the target frame. Finally, the present application can remove the noise point in addition to detecting the noise point. As such, the present application can repair automatically a large number of audio signals, providing an efficient, accurate, and quick method for audio repair.

BRIEF DESCRIPTION OF THE DRAWINGS

In order to describe more clearly technical solutions of embodiments of the present application, the following will briefly introduce accompanying drawings that need to be used in the description of the embodiments.

DETAILED DESCRIPTION

The technical solutions in embodiments of the present application will be clearly and completely described below in conjunction with the drawings in the embodiments of the present application. Obviously, the described embodiments are only a part of rather than all the embodiments. Based on the embodiments in the present application, all other embodiments obtained by those of ordinary skill in the art without creative work shall fall within the protection scope of the present disclosure.

The present application is mainly applied to a device for audio repair. The device for audio repair may be a conventional device for audio repair or a device for audio repair described in the third or fourth embodiment of the present application, which is not limited in the present application. When the device for audio repair transmits data, characteristics of the data are recorded and transmitted in a preset format, where the characteristics of the data include time, location, type, etc.

Due to disturbance of noise, an audio signal may produce a noise point presented as a short-term high-energy pulse, so that noise sounding like "click" may be produced when the audio signal is played. In order to address this issue, the present application provides a method for detecting and repairing the noise point in the audio signal.

In order to better understand the embodiments of the present disclosure, the method applied to the embodiments of the present disclosure will be introduced below in conjunction with FIG. 1. The embodiments of the present disclosure may be applied to a scenario in which a device for audio repair detects and repairs an audio signal.

Figure 1:
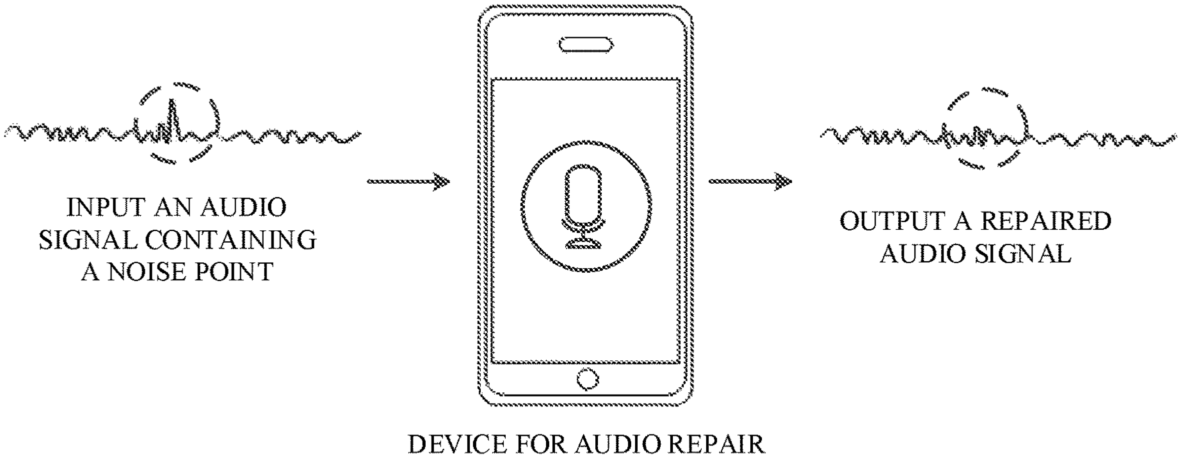
FIG. 1 is a schematic diagram of an application scenario of a method for audio repair provided in embodiments of the present application.

Referring to FIG. 1, the device for audio repair (such as a phone in FIG. 1) obtains an audio signal through microphone recording or receives an audio signal from the Internet, and then detects and repairs a noise point presented as a short-term high-energy pulse in the audio signal. As illustrated in FIG. 1, a dotted line circles a noise point in an unprocessed audio signal, where the noise point is presented as a short-term high-energy pulse. After the audio signal is processed by the device for audio repair, the noise point circled by the dotted line is well repaired. Specifically, the method for audio repair may be roughly divided into five stages, including signal input, cache relocation, noise point detection, noise point repair, and signal output. In the following, the present application will introduce the five stages in sequence.

Figure 4:
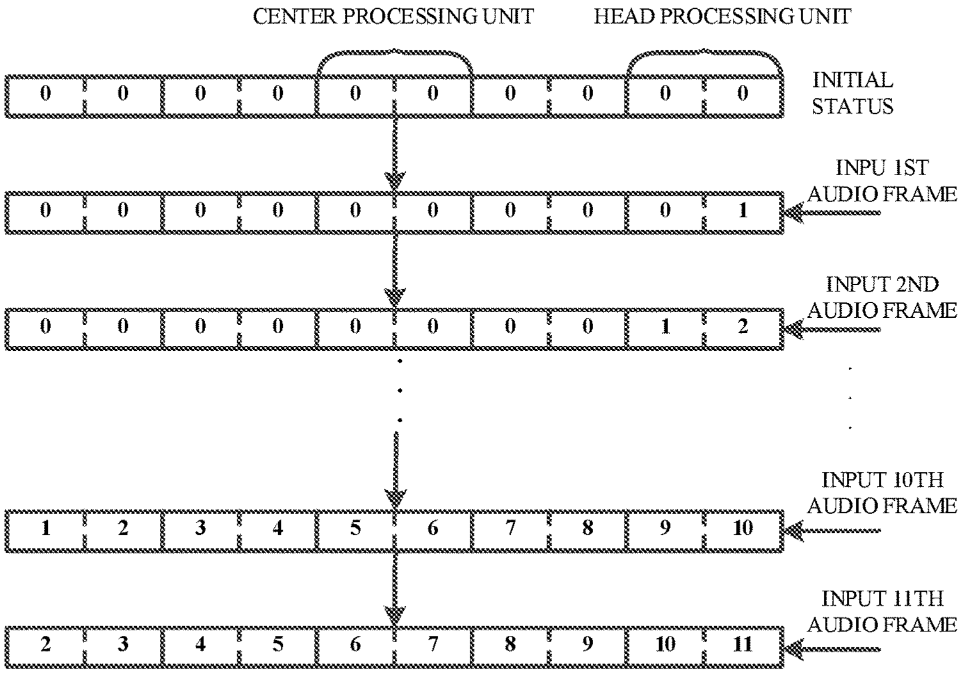
FIG. 4 is a schematic diagram illustrating inputting multiple audio frames into a cache module provided in embodiments of the present application.

In the present application, an obtained audio signal in any format is first framed to obtain multiple audio frames. The multiple audio frames are then inputted into a cache module sequentially and continuously. FIG. 4 illustrates the cache module. The cache module is composed of 5 processing units connected in sequence, where a processing unit at the head of the cache module is a head processing unit, and a signal processing unit at a center of the 5 processing units is a center processing unit. Each processing unit may accommodate two audio frames. The audio frames are inputted from the head processing unit of the cache module and transferred to other processing units according to a connecting order of the processing units. Generally, the cache module may include three or more processing units of any odd number. A length of the processing unit in the cache module can be set to any length value. Generally, the length may be set to a length of at least two audio frames. For example, in case that the processing unit has a length of two audio frames, in the process of audio frame processing, 50% signal overlap may exist between adjacent audio frames, thereby avoiding a truncation effect and obtaining a smoother result of signal processing.

Figure 5:
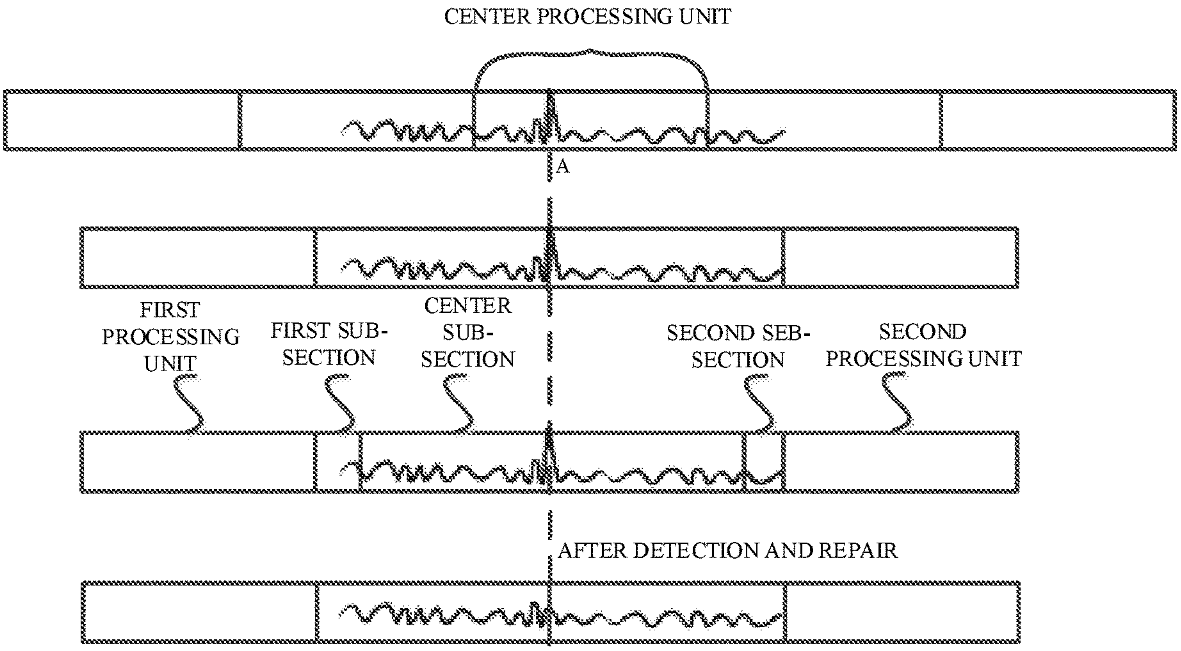
FIG. 5 is a schematic diagram of cache relocation and repair provided in embodiments of the present application.

After the audio frames are inputted to the cache module and each processing unit is filled with audio frames, cache relocation is performed on the multiple audio frames in the cache module. That is, an audio signal segment that needs to be detected is retrieved, centered on a point in the audio frame that is most likely to be a noise point. Specifically, as illustrated in FIG. 5, an audio frame in the center processing unit is assigned as a target frame. A peak point (a point of which an absolute value of an amplitude value is maximum) of the target frame is determined. Based on the peak point, an audio signal segment with a length of 4 processing units is obtained from the cache module. The audio signal segment is re-divided into multiple sections. The multiple sections include a first processing section, a second processing section, and a middle processing section between the first processing section and the second processing section. The middle processing section includes a first sub-section, a second sub-section, and a center sub-section between the first sub-section and the second sub-section. It should be noted that in the present application, since the noise point that needs to be repaired is presented as the short-term high-energy pulse, the noise point is most likely the peak point of the audio frame. In addition, a length of a frame signal after framing of the audio signal is very short, so the possibility that there are two noise points in one audio frame is extremely small. Therefore, in the present application, whether the peak point is the noise point needs to be detected only.

Audio characteristics of the multiple sections in the audio signal segment are extracted, where the audio characteristics include at least one of a peak value, signal energy, average power, a proportion of local peak, a roll-off rate of an autocorrelation coefficient, a sound intensity, or a peak duration. Whether the peak point of the target frame is the noise point is determined according to the audio characteristics of the multiple sections.

After determining that the peak point in the target frame is the noise point, the target frame is repaired. The repair of the target frame mainly includes three steps. The first step is to remove the noise point. A normal value (that is, a normal amplitude value) of the target frame before the target frame is interfered by noise is estimated with a linear prediction method or an adjacent sampling point superposition method, and then an amplitude value at the noise point is replaced by the normal value. The second step is to smooth the target frame, of which the amplitude value is replaced, in time domain with a time-domain smoothing method. The third step is to smooth the target frame, of which the amplitude value is replaced, in frequency domain with a frequency-domain filtering method. After these three steps, the repair of the target frame is completed.

After the repair of the target frame is completed, the repaired target frame is outputted in a preset format. The preset format may be any of a way audio format, an mp3 audio format, and a flac audio format.

As can be seen, in the present application, multiple short audio frames obtained after framing of the audio signal are inputted into the cache module. The audio frame in the center processing unit in the cache module is assigned as the target frame, and the target frame is processed. As such, each audio frame can be processed in the present application without omissions. The audio signal segment of the preset length is obtained from the cache module, where the audio signal segment is centered on the peak point of the audio frame in the center processing unit. The audio signal segment is divided into multiple sections. The audio characteristics of the multiple sections are then extracted. Whether the peak point of the audio frame in the center processing unit is the noise point is determined. If the peak point is determined as the noise point, the target frame is repaired through amplitude replacement, time-domain smoothing, and frequency-domain smoothing. After the repair is completed, the target frame is outputted in any format. Therefore, the biggest advantage of this application is that the noise point in the audio signal can be automatically detected and repaired efficiently, exhaustively, and accurately, which can be adapted to the requirement for fast processing of massive audios and save a lot of labor cost and time cost, resulting in high economic value and technical advantages.

It should be noted that the content illustrated in FIG. 1, FIG. 4, and FIG. 5 is an example, and does not constitute a limitation to the embodiments of the present disclosure, since the present application does not limit the number of processing units contained in the cache module, the length of the processing unit, the length of the audio signal segment obtained by cache relocation, the length of each of the multiple sections divided, the source of the audio signal, the device for audio repair, etc. For example, the cache module may include 5 processing units, or may alternatively include 7 processing units. The audio signal segment may have a length of 4 processing units or 6 processing units. The first sub-section in the multiple sections obtained by dividing the audio signal segment may have a length of ¼ processing units of ½ processing units. The audio signal may be obtained from recording directly, or by any ways such as receiving from the Internet. The device for audio repair that processes the audio signal may be any terminal device such as a phone, a computer, a server, etc.

Figure 2:
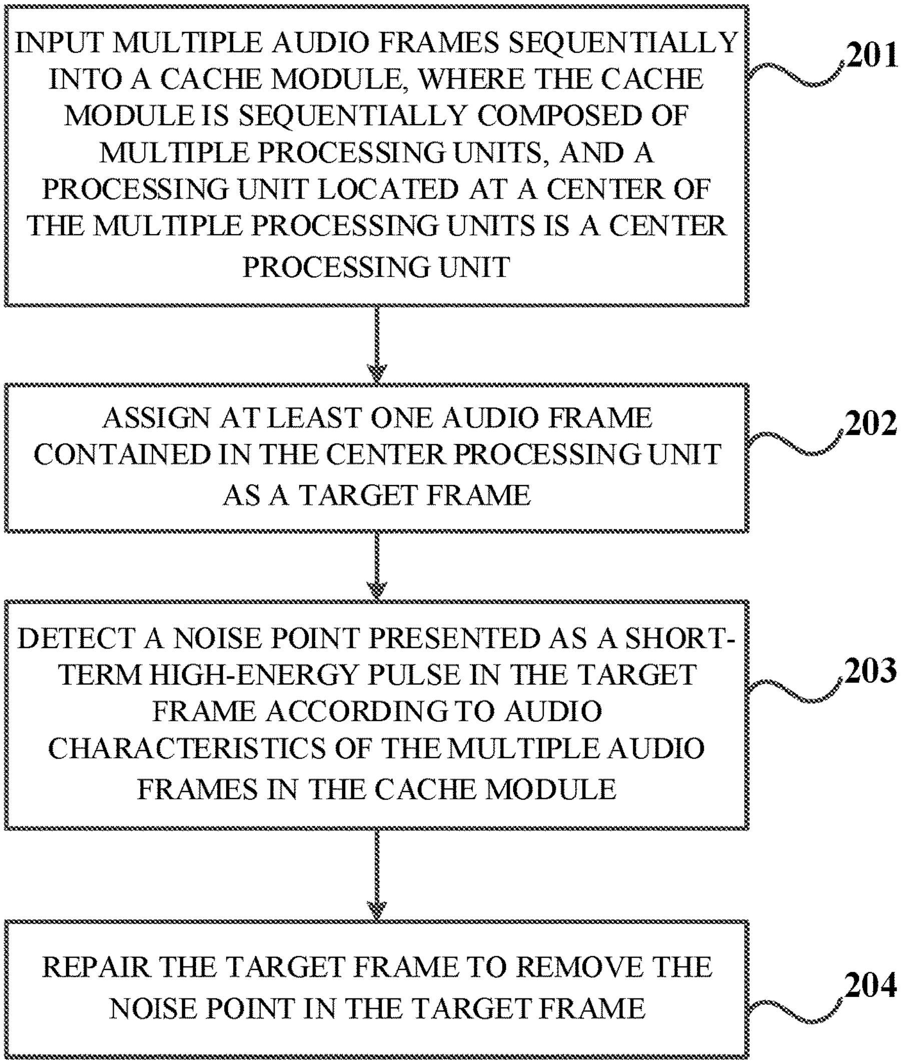
FIG. 2 is a schematic flowchart of a method for audio repair provided in embodiments of the present application.

Referring to FIG. 2, FIG. 2 is a schematic flowchart of a method for audio repair provided in embodiments of the present application. As illustrated in FIG. 2, the method for audio repair includes the following.

At 201, multiple audio frames are inputted sequentially into a cache module, where the cache module is sequentially composed of multiple processing units, and a processing unit located at a center of the multiple processing units is a center processing unit.

In embodiments of the present application, the multiple audio frames are first inputted sequentially and continuously into the cache module. The multiple audio frames are all or part of audio frames obtained by framing an audio signal. Therefore, the multiple audio frames are continuous. According to an order in the audio signal before framing, the multiple audio frames are continuously inputted into a head processing unit in the cache module, and then transferred in sequence to processing units connected to the head processing unit. It should be noted that the cache module includes multiple processing units that are connected sequentially, where a processing unit located at the head is the head processing unit, and the processing unit located at the center is the center processing unit. The afore-mentioned audio signal and multiple audio frames are time-domain signals.

It should be noted that a length of the processing unit in the cache module may be set to any length value. Generally, the length may be set to at least two audio frames. For example, in case that the processing unit has a length of two audio frames, in the process of audio frame processing, there may be 50% signal overlap between adjacent audio frames, thereby avoiding a truncation effect and obtaining a smoother result of signal processing.

As an example, FIG. 4 is a schematic structural diagram of a cache module. The cache module includes for example 5 processing units. The processing unit located at a center is the center processing unit. The processing unit where the audio frames are inputted is the head processing unit. Each processing unit contains two audio frames. The whole cache module includes 10 audio frames in total. As illustrated in FIG. 4, a single processing unit is presented as a black and bold solid line rectangular box containing a dashed line, where two numbers in the box each represent a serial number of a corresponding input audio frame respectively. In an initial status, each processing unit in the cache module have no audio frame input, and thus the serial numbers in the cache module are all 0. When the first audio frame is inputted into the head processing unit at the right end of the cache module, the head processing unit contains 0 and the first audio frame. When the tenth signal is inputted, the processing unit at the center of the cache module contains the fifth and the sixth audio frames.

As can be seen, after the audio signal is framed, the audio signal may be processed in unit of audio frame in subsequent steps, which can meet the requirement for real-time processing of the audio, so that the audio signal can be repaired while the audio frame for which the audio signal is repaired can be outputted.

In another achievable implementation, before the multiple audio frames are inputted sequentially into the cache module, the audio signal to-be-repaired is obtained. The audio signal is then framed to obtain the multiple audio frames that are inputted into the cache module. The audio signal includes a recoding signal and an electronic sound synthetic signal.

In this implementation, before the multiple audio frames are inputted into the cache module, the audio signal to-be-repaired is obtained. The audio signal is then framed to obtain the multiple audio frames. The audio signal may be an audio signal recorded by the device for audio repair, or an audio signal obtained from other terminal devices via the Internet. The audio signal includes the recoding signal and the electronic sound synthetic signal. The recording signal includes an external sound (such as telephone recording) recorded by the local device for audio repair or other terminal devices through peripheral equipment (such as a microphone), etc. The electronic sound synthetic signal is an electronic sound (such as robot singing) synthesized by the local device for audio repair or other terminal devices through audio synthesis software.

It should be noted that the format, size, and the number of channels of the above audio signal are not limited. The format may be any of a way audio format, an mp3 audio format, and a flac audio format. The channel(s) may be any of a mono channel, dual channels, and multi channels.

At 202, at least one audio frame contained in the center processing unit is assigned as a target frame.

In embodiments of the present application, after each processing unit in the cache module is filled with audio frame(s), all audio frame(s) contained in the center processing unit in the cache module is assigned as the target frame. One processing unit may include at least one audio frame.

As can be seen, in embodiments of the present application, after the above-mentioned multiple audio frames are inputted into the cache module, the audio frames are sequentially inputted into other processing units from the head processing unit. After an audio frame is inputted to the center processing unit, the audio frame is assigned as the target frame for subsequent noise point detection and repair, so the embodiments of the present application can process each audio frame without omission. Each audio frame is very short. Generally, the length of the audio frame is from 20 milliseconds to 50 milliseconds, which is less than the length of a phoneme and contains enough vibration periods to meet the requirement of signal processing. The length of the audio frame can be set to 20 milliseconds, 25 milliseconds, 30 milliseconds, 32 milliseconds, 40 milliseconds, 50 milliseconds, etc. Therefore, the present application processes the audio signal in unit of audio frame, which can greatly improve the efficiency of detection in an almost exhaustive manner.

At 203, a noise point presented as a short-term high-energy pulse in the target frame is detected according to audio characteristics of the multiple audio frames in the cache module.

In embodiments of the present application, the audio characteristics of multiple audio frames in the above-mentioned cache module are extracted and then compared. Whether the target frame contains the noise point presented as a short-term high-energy pulse is determined according to the comparison result. Specifically, a peak point of the target frame is determined, which is a point with a maximum amplitude value. An audio signal segment of a preset length centered on the peak point is obtained from the cache module. The audio signal segment is divided into multiple sections. Audio characteristics of the target frame and the multiple sections are extracted and the noise point in the target frame is determined according to the audio characteristics of the target frame and the multiple sections.

It should be noted that the audio characteristics includes at least one of a peak value, signal energy, average power, a proportion of local peak, a roll-off rate of an autocorrelation coefficient, a sound intensity, or a peak duration. The peak value refers to the largest amplitude value in the section. The signal energy refers to an integral of squares of amplitude values of the signal. The average power refers to an average value of the power of the signal during a limited interval or a period. The proportion of local peak refers to the proportion of the peak value of the signal in a sum of peak values of all signals. The roll-off rate of the autocorrelation coefficient refers to a rate at which the autocorrelation coefficient of the signal decreases. The sound intensity refers to the energy passing through a unit area perpendicular to a direction of sound wave propagation per unit time, which is proportional to the square of the sound wave amplitude. The peak duration refers to a duration for which the peak energy of the signal is greater than or equal to a preset value.

It should also be noted that the multiple sections include a first processing section, a second processing section, and a middle processing section between the first processing section and the second processing section. The middle processing section includes a first sub-section, a second sub-section, and a center sub-section between the first sub-section and the second sub-section.

For example, FIG. 5 illustrates cache relocation. Assuming that the cache module includes 5 processing units, point A is determined as the peak point of the target frame in the center processing unit. Centered on the peak point, au audio signal segment with a preset length of 4 processing units is obtained from the cache module. The audio signal segment is divided to obtain multiple sections, which include a first processing section, a middle processing section, and a second processing section. The first processing section and the second processing section each have a length of one audio frame. The middle processing section has a length of two audio frames. The middle processing section includes a first sub-section, a center sub-section, and a second sub-section. The first sub-section and the second sub-section each have a length of ¼ processing units. The center sub-section has a length of 3/2 processing units. After obtaining multiple sections by division, audio characteristics of the multiple sections and the target frame are extracted, and whether the peak point of the target frame is the noise point is determined according to the audio characteristics of the multiple sections and the target frame. The determination criteria are as follows.

The first determination is to determine whether an amplitude value at the peak point of the target frame is greater than an amplitude value at a peak point of the center sub-section and an amplitude value at a peak point of the middle processing section. This determination is used for determining whether the amplitude value at the peak point of the target frame is unique and maximum in adjacent signals.

The second determination is to determine whether the amplitude value at the peak point of the target frame is greater than an amplitude value at a peak point of the first sub-section and an amplitude value at a peak point of the second sub-section and a greater portion exceeds a first threshold (that is, the amplitude value at the peak point of the target frame exceeds the amplitude value at the peak point of the first sub-section and the amplitude value at the peak point of the second sub-section by more than the first threshold). This determination is used for determining whether the amplitude value at the peak point of the target frame is significantly higher than adjacent signals.

The third determination is to determine whether signal energy of the middle processing section is greater than a second threshold. This determination is used for determining whether the energy at the peak point of the target frame is too large.

The fourth determination is to determine whether a ratio of average power of the middle processing section to average power of the audio signal segment is greater than a third threshold. This determination is used for determining whether a signal-to-noise ratio of the peak point of the target frame is too large.

The fifth determination is to determine whether a ratio of the amplitude value of the peak point of the target frame to a sum of amplitude values at peak points of the audio signal segment is greater than a fourth threshold. This determination is used for determining whether a ratio of the amplitude value of the peak point of the target frame to the sum of amplitude values at peak points of respective sections in the audio signal segment is too large.

The sixth determination is to determine whether the roll-off rate of the autocorrelation coefficient of the audio signal segment is greater than a fifth threshold. This determination is used for determining whether the peak point of the target frame is presented as a sharp pulse signal, otherwise, the peak point of the target frame is a continuous pulse signal.

The seventh determination is to determine whether a sound intensity of the middle processing section is greater than a sound intensity of the first processing section and a sound intensity of the second processing section. This determination is used for determining whether the peak point of the target frame is presented as a high-energy pulse.

The eighth determination is to determine whether a peak duration of the target frame is shorter than a sixth threshold. This determination is used for determining whether the peak point of the target frame is presented as a short-term pulse.

It should be noted that in embodiments of the present application, the above eight determinations are performed in serial to determine whether the peak point of the target frame is the noise point. If all the above eight determinations have positive results, the peak point of the target frame can be determined as the noise point. If any of the determinations has a negative result, the peak point of the target frame is determined as not a noise point.

As can be seen, the embodiments of the present application focus on determining whether the peak point of the target frame is the noise point. Since it is proved that the length of the audio frame is very short, the possibility of including two or more noise points in the target frame is extremely small even if the target frame contains multiple audio frames. In combination with the short-term high-energy characteristic of the noise point that needs to be detected, the present application only needs to determine whether the peak point of the target frame is the noise point. In this way, in this application, the noise point can be located quickly without omissions, thereby improving efficiency and accuracy of detection.

At 204, the target frame is repaired to remove the noise point in the target frame.

In embodiments of the present application, after the peak point of the target frame is determined as the noise point, the target frame is repaired. The repair process includes removing the noise point and smoothing the target frame in which the noise point is removed in time domain and frequency domain. Specifically, in the process of removing the noise point, a normal value at the noise point of the target frame before the target frame is interfered by noise is first estimated with any of a linear prediction algorithm and an adjacent sampling point superposition algorithm. An amplitude value at the noise point is replaced with the estimated normal value. Afterwards, time-domain smoothing is performed on the target frame to make the target frame continuous in time domain, and frequency filtering is performed on the target frame to make the target frame continuous in frequency domain.

It should be noted that the above-mentioned time-domain smoothing refers to smoothing endpoints on both sides of the noise point that has the replaced amplitude in the target frame. The method used is mean filtering, that is, a value at each of the two endpoints is replaced by a mean value that is close to the value at the endpoint. Through this method, the target frame after peak value replacement can change more smoothly over time.

It should also be noted that the above-mentioned frequency-domain filtering refers to smoothing the target frame in frequency domain. Since the energy of the target frame at the noise point is larger than the energy of an adjacent audio frame, even resulting in a cracked voice, especially in the higher frequency band, and after the above steps of peak value replacement and time-domain smoothing, the target frame may be more abrupt in the high-frequency band (such as above 16 kHz), it is necessary to smooth the target frame in frequency domain after time-domain smoothing. The frequency-domain smoothing method adopted in embodiments of the present application is to perform low-pass filtering on the target frame using a zero-phase-shift digital filter, where the cut-off frequency of the low-pass filter is equal to an average spectral height of the audio signal before framing. This is advantageous in that compared to a high frequency range of the audio signal with weak or no energy before framing, the target frame after noise point repair will not add new repair marks, that is, the unprocessed recording signal and the processed recording signal have good consistency in the frequency domain.

In another achievable implementation, although any of the linear prediction algorithm and the adjacent sampling point superposition algorithm may be used to estimate the normal value of the noise point, each of these two algorithms has its own advantage. The former is characterized by obtaining the predicted value based on the minimum mean square error criterion using the past sampling points of the signal, which requires a large amount of calculation and has a smooth processing effect, thereby suitable for an application scenario of an offline non-real-time system. The latter is characterized by performing the power exponential descent on adjacent sampling points to obtain the predicted value, which requires a small amount of calculation and has a moderate processing effect, thereby suitable for an application scenario of an online real-time system. Based on the different advantages of the two methods, the device in embodiments of the present application can choose between the two methods according to the application scenario. In a terminal real-time system, due to high real-time requirements, the adjacent sampling point superposition-based method may be selected for peak value replacement. In a local offline system, since there is no high requirement for real-time performance, in order to guarantee the processing performance, the linear prediction-based method may be selected for peak value replacement.

In another achievable implementation, after the target frame is repaired, the repaired target frame is outputted in a preset format. The preset format may be any of a way audio format, an mp3 audio format, and a flac audio format. A user may set the preset format, which is not limited in the present application.

In embodiments of present application, multiple audio frames are sequentially inputted into the cache module. The audio frame(s) contained in the center processing unit in the cache module is then assigned as the target frame. The noise point in the target frame is determined according to the audio characteristics of the multiple audio frames in the cache module. At last, the target frame is repaired. As can be seen, the present application has at least the following innovations. Firstly, the present application can detect and repair the noise point in each audio frame exhaustively and accurately by inputting sequentially multiple audio frames in to the cache module and processing successively the audio frame in the center processing unit in the cache module. Secondly, the present application can detect the noise point in the target frame accurately by comparing the audio characteristics of the target frame and the audio characteristics of the audio frame adjacent to the target frame. Finally, the present application can remove the noise point in addition to detecting the noise point. As such, the embodiments of present application can repair automatically a large number of audio signals, providing an efficient, accurate, and quick method for audio repair.

Figure 3:
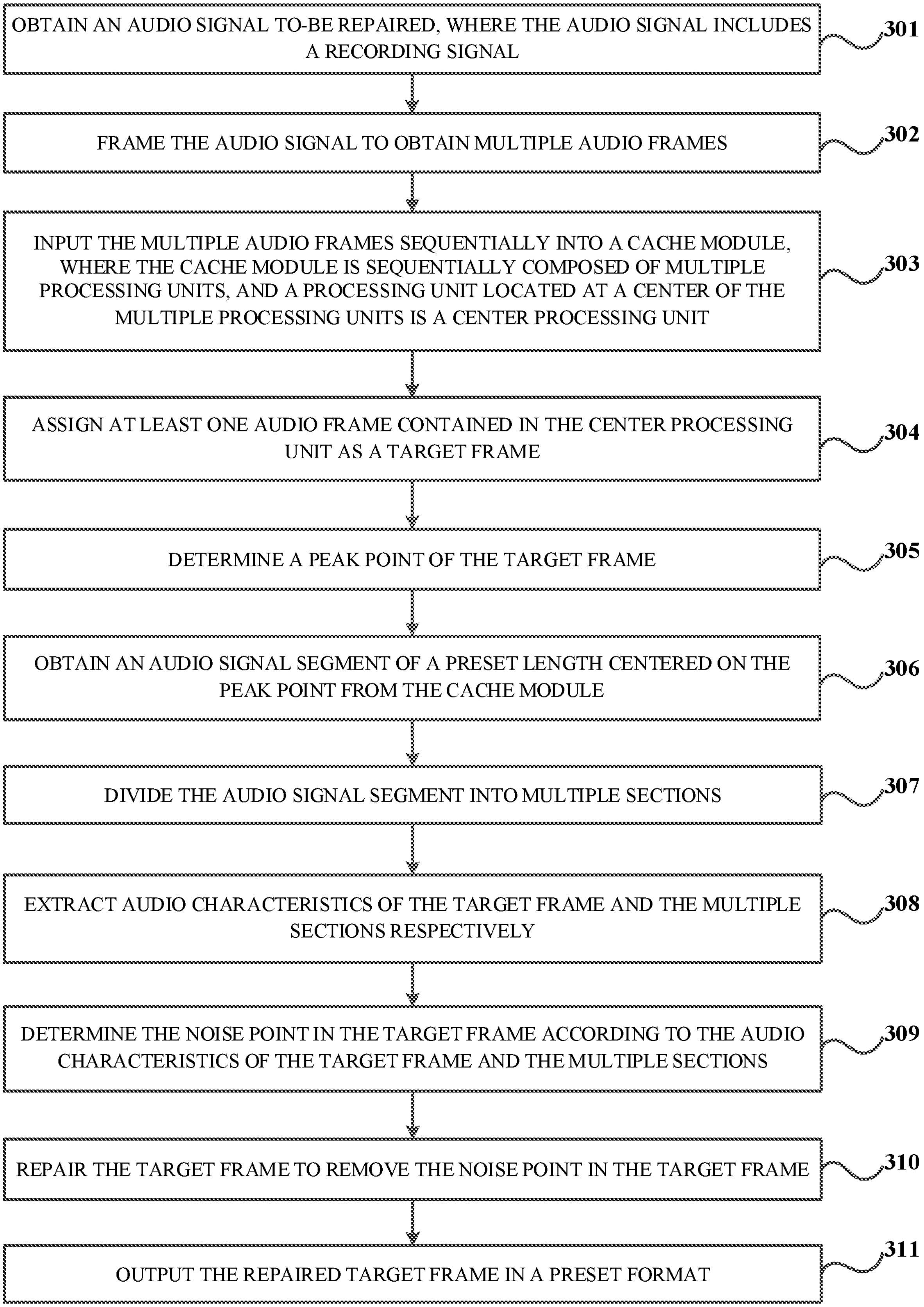
FIG. 3 is a schematic flowchart of a method for audio repair provided in another embodiment of the present application.

Referring to FIG. 3, FIG. 3 is a schematic flowchart of another method for audio repair provided in embodiments of the present application. As illustrated in FIG. 3, the method for audio repair includes the following.

At 301, an audio signal to-be repaired is obtained, where the audio signal includes a recording signal.

In embodiments of the present application, the audio signal to-be-repaired is obtained. The audio signal includes a recoding signal and an electronic sound synthetic signal. The audio signal may be an audio signal recorded by the device for audio repair, or an audio signal obtained from other terminal devices via the Internet, where the audio signal includes a recoding signal and an electronic sound synthetic signal. The recording signal includes an external sound (such as telephone recording) recorded by the local device for audio repair or other terminal devices through peripheral equipment (such as a microphone), etc. The electronic sound synthetic signal is an electronic sound (such as robot singing) synthesized by the local device for audio repair or other terminal devices through audio synthesis software.

It should be noted that the format, size, and the number of channels of the above audio signal are not limited. The format may be any of a way audio format, an mp3 audio format, and a flac audio format. The channel(s) may be any of a mono channel, dual channels, and multi channels.

At 302, the audio signal is framed to obtain multiple audio frames.

In this implementation, after the audio signal to-be-repaired is obtained, the audio signal is framed to obtain the multiple audio frames.

At 303, the multiple audio frames are inputted sequentially into a cache module, where the cache module is sequentially composed of multiple processing units, and a processing unit located at a center of the multiple processing units is a center processing unit.

In embodiments of the present application, the multiple audio frames are first inputted sequentially and continuously into the cache module. The multiple audio frames are all or part of audio frames obtained by framing an audio signal. Therefore, the multiple audio frames are continuous. According to an order in the audio signal before framing, the multiple audio frames are continuously inputted into a head processing unit in the cache module, and then transferred in sequence to processing units connected to the head processing unit. It should be noted that the cache module includes multiple processing units that are connected sequentially, where a processing unit located at the head is the head processing unit, and the processing unit located at the center is the center processing unit. The afore-mentioned audio signal and multiple audio frames are time-domain signals.

It should be noted that a length of the processing unit in the cache module may be set to any length value. Generally, the length may be set to at least two audio frames. For example, in case that the processing unit has a length of two audio frames, in the process of audio frame processing, there may be 50% signal overlap between adjacent audio frames, thereby avoiding a truncation effect and leading to a smoother result of signal processing.

As an example, FIG. 4 is a schematic structural diagram of a cache module. The cache module includes for example 5 processing units. The processing unit located at a center is the center processing unit. The processing unit where the audio frames are inputted is the head processing unit. Each processing unit contains two audio frames. The whole cache module includes 10 audio frames in total. As illustrated in FIG. 4, a single processing unit is represented as a black and bold solid line rectangular box containing a dashed line, where two numbers in the box each represent a serial numbers of a corresponding input audio frame respectively. In an initial status, each processing unit in the cache module have no audio frame input, and thus the serial numbers in the cache module are all 0. When the first audio frame is inputted into the head processing unit at the right end of the cache module, the head processing unit contains 0 and the first audio frame. When the tenth signal is inputted, the processing unit at the center of the cache module contains the fifth and the sixth audio frames.

As can be seen, after the audio signal is framed, the audio signal may be processed in unit of audio frame in subsequent steps, which can meet the requirement for real-time processing of the audio, so that the audio signal can be repaired while the audio frame for which the audio signal is repaired can be outputted.

At 304, at least one audio frame contained in the center processing unit is assigned as a target frame.

In embodiments of the present application, after each processing unit in the cache module is filled with audio frame(s), all audio frame(s) contained in the center processing unit in the cache module is assigned as the target frame. One processing unit may include at least one audio frame.

As can be seen, in embodiments of the present application, after the above-mentioned multiple audio frames are inputted into the cache module, the audio frames are sequentially inputted into other processing units from the head processing unit. After an audio frame is inputted to the center processing unit, the audio frame is assigned as the target frame for subsequent noise point detection and repair, so the embodiments of the present application can process each audio frame without omission. Each audio frame is very short. Generally, the length of the audio frame is from 20 milliseconds to 50 milliseconds, which is less than the length of a phoneme and contains enough vibration periods to meet the requirement of signal processing. The length of the audio frame can be set to 20 milliseconds, 25 milliseconds, 30 milliseconds, 32 milliseconds, 40 milliseconds, 50 milliseconds, etc. Therefore, the present application processes the audio signal in unit of audio frame, which can greatly improve the efficiency of detection in an almost exhaustive manner.

At 305, a peak point of the target frame is determined.

In embodiments of the present application, the peak point of the target frame is determined, where the peak point is a point with a maximum amplitude.

For example, the cache module as illustrated in FIG. 5 includes 5 processing units, and the peak point of the target frame in the center processing unit is determined as point A.

At 306, an audio signal segment of a preset length centered on the peak point is obtained from the cache module.

In embodiments of the present application, the audio signal segment of a preset length centered on the peak point is obtained from the cache module. The preset length of the audio signal segment may be any preset value.

For example, as illustrated in FIG. 5, centered on the peak point of the target frame, an audio signal segment with a preset length of 4 processing units is obtained from the cache module.

At 307, the audio signal segment is divided into multiple sections.

The audio signal segment is divided into multiple sections.

The multiple sections include a first processing section, a second processing section, and a middle processing section between the first processing section and the second processing section. The middle processing section includes a first sub-section, a second sub-section, and a center sub-section between the first sub-section and the second sub-section.

For example, as illustrated in FIG. 5, after the audio signal segment with a preset length of 4 processing units is obtained, the audio signal segment is divided to obtain multiple sections, which include a first processing section, a middle processing section, and a second processing section. The first processing section and the second processing section each have a length of one audio frame. The middle processing section has a length of two audio frames. The middle processing section includes a first sub-section, a center sub-section, and a second sub-section. The first sub-section and the second sub-section each have a length of ¼ processing units. The center sub-section has a length of 3/2 processing units.

At 308, audio characteristics of the target frame and the multiple sections are extracted respectively.

In embodiments of the present application, after the audio signal segment is re-divided into multiple sections, the audio characteristics of the target frame and the multiple sections are extracted respectively. The audio characteristics include at least one of a peak value, signal energy, average power, a proportion of local peak, a roll-off rate of an autocorrelation coefficient, a sound intensity, or a peak duration. The peak value refers to the largest amplitude value in the section. The signal energy refers to an integral of the squares of amplitude values of the signal. The average power refers to an average value of the power of the signal during a limited interval or a period. The proportion of local peak refers to the proportion of the peak value of the signal in a sum of the peak values of all the signals. The roll-off rate of the autocorrelation coefficient refers to a rate at which the autocorrelation coefficient of the signal decreases. The sound intensity refers to the energy passing through a unit area perpendicular to a direction of sound wave propagation per unit time, which is proportional to the square of the sound wave amplitude. The peak duration refers to a duration for which the peak energy of the signal is greater than or equal to a preset value.

At 309, the noise point in the target frame is determined according to the audio characteristics of the target frame and the multiple sections.

In embodiments of the present application, whether the peak point of the target frame is the noise point is determined according to the audio characteristics of the multiple sections and the target frame. The determination criteria are as follows.

The first determination is to determine whether an amplitude value at the peak point of the target frame is greater than an amplitude value at a peak point of the center sub-section and an amplitude value at a peak point of the middle processing section. This determination is used for determining whether the amplitude value at the peak point of the target frame is unique and maximum in adjacent signals.

The second determination is to determine whether the amplitude value at the peak point of the target frame is greater than an amplitude value at a peak point of the first sub-section and an amplitude value at a peak point of the second sub-section and a greater portion exceeds a first threshold. This determination is used for determining whether the amplitude value at the peak point of the target frame is significantly higher than adjacent signals.

The third determination is to determine whether signal energy of the middle processing section is greater than a second threshold. This determination is used for determining whether the energy at the peak point of the target frame is too large.

The fourth determination is to determine whether a ratio of average power of the middle processing section to average power of the audio signal segment is greater than a third threshold. This determination is used for determining whether a signal-to-noise ratio of the peak point of the target frame is too large.

The fifth determination is to determine whether a ratio of the amplitude value of the peak point of the target frame to a sum of amplitude values at peak points of the audio signal segment is greater than a fourth threshold. This determination is used for determining whether a ratio of the amplitude value of the peak point of the target frame to the sum of amplitude values at peak points of respective sections in the audio signal segment is too large.

The sixth determination is to determine whether the roll-off rate of the autocorrelation coefficient of the audio signal segment is greater than a fifth threshold. This determination is used for determining whether the peak point of the target frame is presented as a sharp pulse signal, otherwise, the peak point of the target frame is a continuous pulse signal.

The seventh determination is to determine whether a sound intensity of the middle processing section is greater than a sound intensity of the first processing section and a sound intensity of the second processing section. This determination is used for determining whether the peak point of the target frame is presented as a high-energy pulse.

The eighth determination is to determine whether a peak duration of the target frame is shorter than a sixth threshold. This determination is used for determining whether the peak point of the target frame is presented as a short-term pulse.

It should be noted that in embodiments of the present application, the above eight determinations are performed in serial to determine whether the peak point of the target frame is the noise point. If all the above eight determinations have positive results, the peak point of the target frame can be determined as the noise point. If any of the determination has a negative result, the peak point of the target frame is determined as not a noise point.

As can be seen, the embodiments of the present application focus on determining whether the peak point of the target frame is the noise point. Since it is proved that the length of the audio frame is very short, the possibility of including two or more noise points in the target frame is extremely small even if the target frame contains multiple audio frames. In combination with the short-term high-energy characteristic of the noise point that needs to be detected, the present application only needs to determine whether the peak point of the target frame is the noise point. In this way, in this application, the noise point can be located quickly without omissions, thereby improving efficiency and accuracy of detection.

At 310, the target frame is repaired to remove the noise point in the target frame.

In embodiments of the present application, after the peak point of the target frame is determined as the noise point, the target frame is repaired. The repair process includes removing the noise point and smoothing the target frame in which the noise point is removed in time domain and frequency domain. Specifically, in the process of removing the noise point, a normal value at the noise point of the target frame before the target frame is interfered by noise is first estimated with any of a linear prediction algorithm and an adjacent sampling point superposition algorithm. An amplitude value at the noise point is replaced with the estimated normal value. Afterwards, time-domain smoothing is performed on the target frame to make the target frame continuous in time domain, and frequency filtering is performed on the target frame to make the target frame continuous in frequency domain.

It should be noted that the above-mentioned time-domain smoothing refers to smoothing endpoints on both sides of the noise point that has the replaced amplitude in the target frame. The method used is mean filtering, that is, a value at each of the two endpoints is replaced by a mean value that is close to the value at the endpoint. Through this method, the target frame after peak value replacement can change more smoothly over time.

It should also be noted that the above-mentioned frequency-domain filtering refers to smoothing the target frame in frequency domain. Since the energy of the target frame at the noise point is larger than the energy of an adjacent audio frame, even resulting in a cracked voice, especially in the higher frequency band, and after the above steps of peak value replacement and time-domain smoothing, the target frame may be more abrupt in the high frequency band (such as above 16 kHz), it is necessary to smooth the target frame in the frequency-domain after time-domain smoothing. The frequency-domain smoothing method adopted in embodiments of the present application is to perform low-pass filtering on the target frame using a zero-phase-shift digital filter, where the cut-off frequency of the low-pass filter is equal to an average spectral height of the audio signal before framing. This is advantageous in that compared to a high frequency range of the audio signal with weak or no energy before framing, the target frame after noise point repair will not add new repair marks, that is, the unprocessed recording signal and the processed recording signal have good consistency in the frequency domain.

In another achievable implementation, although any of the linear prediction algorithm and the adjacent sampling point superposition algorithm may be used to estimate the normal value of the noise point, each of these two algorithms has its own advantage. The former is characterized by obtaining the predicted value based on the minimum mean square error criterion using the past sampling points of the signal, which requires a large amount of calculation and has a smooth processing effect, thereby suitable for an application scenario of an offline non-real-time system. The latter is characterized by performing the power exponential descent on adjacent sampling points to obtain the predicted value, which requires a small amount of calculation and has a moderate processing effect, thereby suitable for an application scenario of an online real-time system. Based on the different advantages of the two methods, the device in embodiments of the present application can choose between the two methods according to the application scenario. In a terminal real-time system, due to high real-time requirements, the adjacent sampling point superposition-based method may be selected for peak value replacement. In a local offline system, since there is no high requirement for real-time performance, in order to guarantee the processing performance, the linear prediction-based method may be selected for peak value replacement.

At 311, the repaired target frame is outputted in a preset format.

In embodiments of the present application, after the target frame is repaired, the repaired target frame is outputted in the preset format. The preset format may be any of a way audio format, an mp3 audio format, and a flac audio format. A user may set the preset format, which is not limited in the present application.

Compared with the previous embodiment, this embodiment of the present application describes the process of the method for audio repair in greater detail. The audio signal is first obtained. The multiple audio frames obtained by framing the audio signal are inputted into the cache module. The audio frame in the center processing unit in the cache module is then assigned as the target frame, and the peak point in the target frame is determined. Centered on the peak point, the audio signal segment of a preset length is obtained from the cache module. The audio signal segment is re-divided to obtain multiple sections. According to the audio characteristics of other audio frames in the cache module, the noise point in the target frame is determined. At last, the target frame is repaired and outputted. As such, a large amount of audio signals can be repaired automatically in embodiments of the present application, providing an efficient, accurate, and quick method for audio repair.

It should be noted that the above description of the various embodiments tends to emphasize the differences between the various embodiments, and the identities or similarities can be referred to each other. For the sake of brevity, details are not repeated herein.

Figure 6:
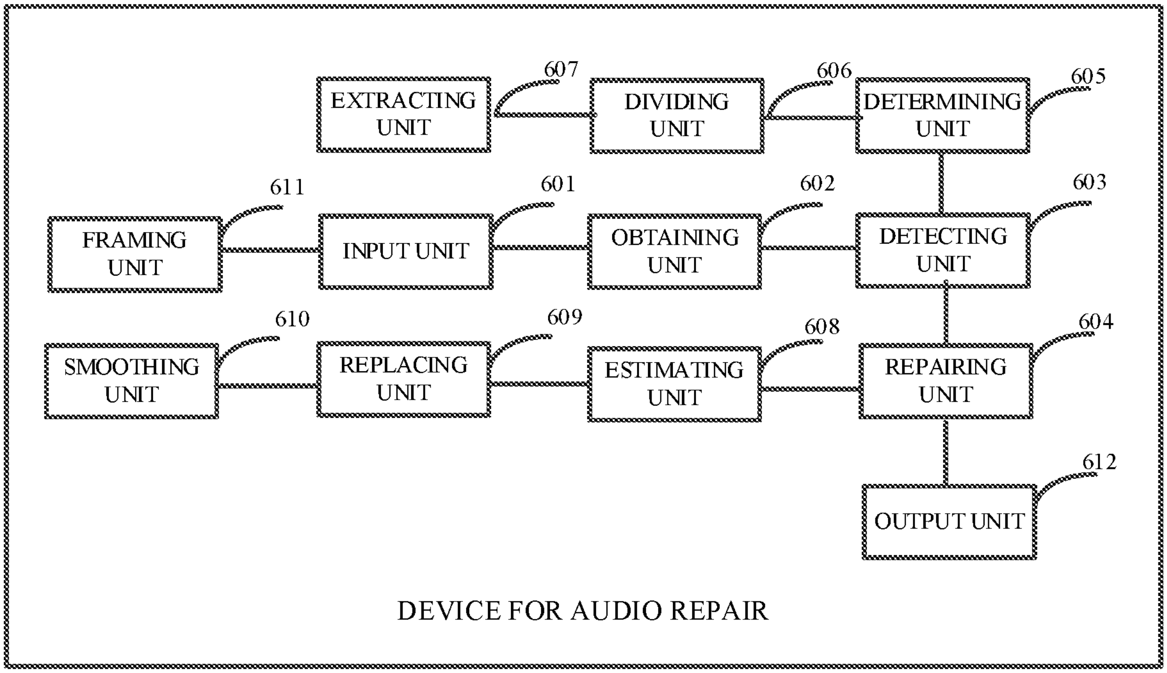
FIG. 6 is a schematic block diagram of a device for audio repair provided in embodiments of the present application.

Embodiments of the present application further provides a device for audio repair. The device for audio repair is configured to implement any of the afore-mentioned methods for audio repair. Specifically, referring to FIG. 6, FIG. 6 is a schematic block diagram of a device for audio repair provided in embodiments of the present application. The device for audio repair in this embodiment includes an input unit 601, an obtaining unit 602, a detecting unit 603, and a repairing unit 604.

Specifically, the input unit 601 is configured to input sequentially multiple audio frames into a cache module, where the cache module is sequentially composed of multiple processing units, and a processing unit located at a center of the multiple processing units is a center processing unit.

The obtaining unit 602 is configured to assign at least one audio frame contained in the center processing unit as a target frame.

The detecting unit 603 is configured to detect a noise point presented as a short-term high-energy pulse in the target frame according to audio characteristics of the multiple audio frames in the cache module.

The repairing unit 604 is configured to repair the target frame to remove the noise point in the target frame.

In another achievable implementation, the device for audio repair further includes a determining unit 605 configured to determine a peak point of the target frame. The obtaining unit 602 is further configured to obtain an audio signal segment of a preset length centered on the peak point from the cache module. The device for audio repair further includes a dividing unit 606 configured to divide the audio signal segment into multiple sections, where the multiple sections include a first processing section, a second processing section, and a middle processing section between the first processing section and the second processing section, and the middle processing section includes a first sub-section, a second sub-section, and a center sub-section between the first sub-section and the second sub-section. The device for audio repair further includes an extracting unit 607 configured to extract audio characteristics of the target frame and the multiple sections respectively, where the audio characteristics include at least one of a peak value, signal energy, average power, a proportion of local peak, a roll-off rate of an autocorrelation coefficient, a sound intensity, or a peak duration. The determining unit 605 is further configured to determine the noise point in the target frame according to the audio characteristics of the target frame and the multiple sections.

Specifically, the determining unit 605 is specifically configured to determine: whether an amplitude value at the peak point of the target frame is greater than an amplitude value at a peak point of the center sub-section and an amplitude value at a peak point of the middle processing section; whether the amplitude value at the peak point of the target frame is greater than an amplitude value at a peak point of the first sub-section and an amplitude value at a peak point of the second sub-section and a greater portion exceeds a first threshold; whether signal energy of the middle processing section is greater than a second threshold; whether a ratio of average power of the middle processing section to average power of the audio signal segment is greater than a third threshold; whether a ratio of the amplitude value of the peak point of the target frame to a sum of amplitude values at peak points of the audio signal segment is greater than a fourth threshold; whether the roll-off rate of the autocorrelation coefficient of the audio signal segment is greater than a fifth threshold; whether a sound intensity of the middle processing section is greater than a sound intensity of the first processing section and a sound intensity of the second processing section; and whether a peak duration of the target frame is shorter than a sixth threshold. The determining unit 605 is further configured to determine the peak point of the target frame as the noise point if the above determination results are all positive.

In another achievable implementation, the device for audio repair further includes an estimating unit 608 configured to estimate, with an estimation algorithm, a normal value at the noise point of the target frame before the target frame is interfered by noise. The device for audio repair further includes a replacing unit 609 configured to replace an amplitude value at the noise point with the normal value. The device for audio repair further includes a smoothing unit 610 configured to perform time-domain smoothing on the target frame to make the target frame continuous in time domain. The smoothing unit 610 is further configured to perform frequency filtering on the target frame to make the target frame continuous in frequency domain.

It should be noted that the estimation algorithm includes any of a linear prediction algorithm and an adjacent sampling point superposition algorithm.

In another achievable implementation, the obtaining unit 602 is configured to obtain an audio signal to-be repaired, where the audio signal includes a recording signal. The device for audio repair further includes a framing unit 611 configured to frame the audio signal to obtain the multiple audio frames.

In another achievable implementation, the device for audio repair further includes an output unit 612 configured to output the repair target frame in a preset format, where the preset format includes any of a way audio format, an mp3 audio format, and a flac audio format.

In the present application, multiple audio frames are sequentially inputted into the cache module by the input unit. The audio frame(s) contained in the center processing unit in the cache module is then assigned as the target frame by the obtaining unit. The noise point in the target frame is determined according to the audio characteristics of the multiple audio frames in the cache module by the detecting unit. At last, the target frame is repaired by the repairing unit. As can be seen, the embodiments of the present application have at least the following innovations. Firstly, the present application can locate the noise point in the audio exhaustively and accurately by framing the audio signal into multiple short audio frames and inputting sequentially and continuously the multiple audio frames into the cache module. Secondly, the present application can detect the noise point in the target frame accurately by comparing the audio characteristics of the target frame and the audio characteristics of the audio frame adjacent to the target frame. Finally, the present application can remove the noise point in addition to detecting the noise point. As such, the embodiments of the present application can repair automatically a large number of audio signals, providing an efficient, accurate, and quick method for audio repair.

Figure 7:
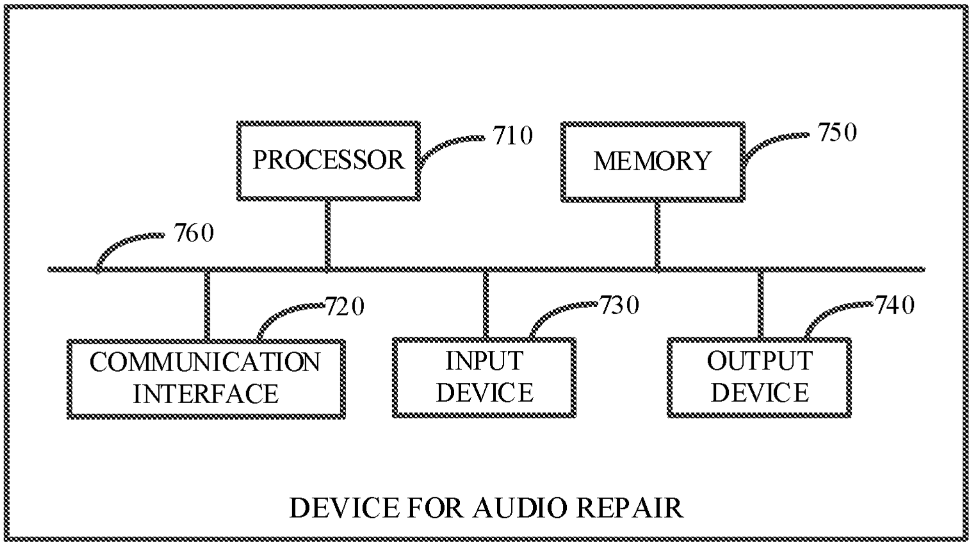
FIG. 7 is a schematic structural diagram of a device for audio repair provided in embodiments of the present application.

Referring to FIG. 7, FIG. 7 is a schematic structural diagram of a device for audio repair provided in embodiments of the present application. As illustrated in FIG. 7, the device for audio repair includes a processor 710, a communication interface 720, an input device 730, an output device 740, and a memory 750. The processor 710, the communication interface 720, the input device 730, the output device 740, and the memory 750 are coupled through a bus 760.

Specifically, the processor 710 is configured to implement the function of the input unit 601, to input sequentially multiple audio frames into a cache module, where the cache module is sequentially composed of multiple processing units, and a processing unit located at a center of the multiple processing units is a center processing unit. The processor 710 is further configured to implement the function of the obtaining unit 602, to assign at least one audio frame contained in the center processing unit as a target frame. The processor 710 is further configured to implement the function of the detecting unit 603, to detect a noise point presented as a short-term high-energy pulse in the target frame according to audio characteristics of the multiple audio frames in the cache module. The processor 710 is further configured to implement the function of the repairing unit 604, to repair the target frame to remove the noise point in the target frame.

In another achievable implementation, the processing unit is further configured to implement the function of the determining unit 605, to determine a peak point of the target frame and obtain an audio signal segment of a preset length centered on the peak point from the cache module. The processing unit is further configured to implement the function of the dividing unit 606, to divide the audio signal segment into multiple sections, where the multiple sections include a first processing section, a second processing section, and a middle processing section between the first processing section and the second processing section, and the middle processing section includes a first sub-section, a second sub-section, and a center sub-section between the first sub-section and the second sub-section. The processing unit is further configured to implement the function of the extracting unit 607, to extract audio characteristics of the target frame and the multiple sections respectively, where the audio characteristics include at least one of a peak value, signal energy, average power, a proportion of local peak, a roll-off rate of an autocorrelation coefficient, a sound intensity, or a peak duration. The processing unit is further configured to determine the noise point in the target frame according to the audio characteristics of the target frame and the multiple sections.

Specifically, the processor 710 is specifically configured to determine: whether an amplitude value at the peak point of the target frame is greater than an amplitude value at a peak point of the center sub-section and an amplitude value at a peak point of the middle processing section; whether the amplitude value at the peak point of the target frame is greater than an amplitude value at a peak point of the first sub-section and an amplitude value at a peak point of the second sub-section and a greater portion exceeds a first threshold; whether signal energy of the middle processing section is greater than a second threshold; whether a ratio of average power of the middle processing section to average power of the audio signal segment is greater than a third threshold; whether a ratio of the amplitude value of the peak point of the target frame to a total amplitude value at peak points of the audio signal segment is greater than a fourth threshold; whether the roll-off rate of the autocorrelation coefficient of the audio signal segment is greater than the fourth threshold; whether a sound intensity of the middle processing section is greater than a sound intensity of the first processing section and a sound intensity of the second processing section; and whether a peak duration of the target frame is shorter than a fifth threshold. The processor 710 is further configured to determine the peak point of the target frame as the noise point if the above determination results are all positive.

In another achievable implementation, the processor 710 is further configured to implement the function of the estimating unit 608, to estimate, with an estimation algorithm, a normal value at the noise point of the target frame before the target frame is interfered by noise. The processor 710 is further configured to implement the function of the replacing unit 609, to replace an amplitude value at the noise point with the normal value. The processor 710 is further configured to implement the function of the smoothing unit 610, to perform time-domain smoothing on the target frame to make the target frame continuous in time domain, and perform frequency filtering on the target frame to make the target frame continuous in frequency domain.

It should be noted that the estimation algorithm includes any of a linear prediction algorithm and an adjacent sampling point superposition algorithm.

In another achievable implementation, the input device 730 or the communication interface 720 is configured to implement the function of the obtaining unit 602, to obtain an audio signal to-be repaired, where the audio signal includes a recording signal. The processor 710 is further configured to implement the function of the framing unit 611, to frame the audio signal to obtain the multiple audio frames.

In another achievable implementation, the output device 740 is configured to implement the function of the output unit 612, to output the repair target frame in a preset format, where the preset format includes any of a way audio format, an mp3 audio format, and a flac audio format.

It should be understood that in embodiments of the present application, the processor 710 may be a central processing unit (CPU). The processor 710 may also be other general-purpose processors, digital signal processors (DSPs), application specific integrated circuits (ASICs), Field-programmable gate arrays (FPGAs), or other programmable logic devices, discrete gates or transistor logic devices, discrete hardware components, etc. The general-purpose processor may be a microprocessor or the processor may also be any conventional processor, etc.

The memory 750 may include a read-only memory and a random access memory, and provides instructions and data to the processor 710. A part of the memory 750 may also include a non-volatile random access memory. For example, the memory 750 may also store device type information.

The computer-readable storage medium may be an internal storage unit of the audio repair device of any of the foregoing embodiments, such as hard disk or memory of the audio repair device. The computer-readable storage medium can also be an external storage device of the audio repair device, such as the plug-in hard disk, smart media card (SMC), secure digital (SD) card, flash card, etc. equipped on the device for audio repair. Further, the computer-readable storage medium may also include both an internal storage unit of the device for audio repair and an external storage device. The computer-readable storage medium is configured to store computer programs and other programs and data required by the device for audio repair. The computer-readable storage medium can also be configured to temporarily store data that has been output or will be output.

In a specific implementation, the processor 710 described in embodiments of present application may implement the implementations described in the second embodiment and the third embodiment for the methods for audio repair provided in embodiments of the present application, and may also implement the implementation for the device for audio repair described in embodiments of the present application, which will not be repeated herein.

A person of ordinary skill in the art may realize that the units and algorithm steps of the examples described in embodiments disclosed herein can be implemented by electronic hardware, computer software, or a combination thereof. In order to clearly illustrate the interchangeability of hardware and software, the components and steps of each example have been generally described in accordance with the functions in the above description. Whether these functions are executed by hardware or software depends on the specific application and design constraint conditions of the technical solution. Professionals and technicians can use different audio repair methods for each specific application to implement the described functions, but such implementation should not be considered beyond the scope of this application.

Those skilled in the art can clearly understand that, for the convenience and conciseness of description, the specific working process of the device for audio repair and units described above can refer to the corresponding process in the foregoing embodiments for methods for audio repair, which will not be repeated here.

In the several embodiments provided in this application, it should be understood that the disclosed device and method for audio repair can be implemented in other ways. For example, the device embodiments described above are merely illustrative. For example, the division of units is only a logical function division, and there may be other divisions in actual implementation. For example, multiple units or components can be combined or integrated into another system, or some features can be ignored or not implemented. In addition, the illustrated or discussed mutual coupling or direct coupling or communication connection may be indirect coupling or communication connection through some interfaces, devices or units, and may also be electrical, mechanical or other forms of connection.

The units described as separate components may or may not be physically separate, and the components illustrated as units may or may not be physical units, that is, they may be located in one place, or they may be distributed on multiple network elements. Some or all of the units may be selected according to actual needs to achieve the objectives of the solutions of the embodiments of the present application.

In addition, the functional units in various embodiments of the present application may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer-readable storage medium. Based on such understanding. The essence of the technical solution of this application or the part that contributes to the existing technology, or all or part of the technical solution, can be embodied in the form of a software product. The computer software product is stored in a storage medium and includes several instructions to make a computer device (which may be a personal computer, a device for audio repair, or a network device, etc.) execute all or part of the steps of the methods in the various embodiments of the present application. The aforementioned storage medium includes: U disk, mobile hard disk, read-only memory (ROM), random access memory (RAM), magnetic disks or optical disks, and other media that can store program codes.

The invention claimed is:

1. A method for audio repair, comprising:

inputting sequentially a plurality of audio frames into a cache module, the cache module being sequentially composed of a plurality of processing units, a processing unit located at a center of the plurality of processing units being a center processing unit;

assigning at least one audio frame contained in the center processing unit as a target frame;

detecting a noise point presented as a short-term high-energy pulse in the target frame according to audio characteristics of the plurality of audio frames in the cache module, wherein the detecting comprises:

determining a peak point of the target frame;

obtaining, from the cache module, an audio signal segment of a preset length centered on the peak point;

dividing the audio signal segment into a plurality of sections, wherein the plurality of sections comprise a first processing section, a second processing section, and a middle processing section between the first processing section and the second processing section, and the middle processing section comprises a first sub-section, a second sub-section, and a center sub-section between the first sub-section and the second sub-section;

extracting audio characteristics of the target frame and the plurality of sections respectively, wherein the audio characteristics comprise at least one of a peak value, signal energy, average power, a proportion of local peak, a roll-off rate of an autocorrelation coefficient, a sound intensity, or a peak duration; and determining the noise point in the target frame according to the audio characteristics of the target frame and the plurality of sections, wherein the determining the noise point in the target frame comprises:

determining whether an amplitude value at the peak point of the target frame is greater than an amplitude value at a peak point of the center sub-section and an amplitude value at a peak point of the middle processing section;

determining whether the amplitude value at the peak point of the target frame is greater than an amplitude value at a peak point of the first sub-section and an amplitude value at a peak point of the second sub-section and a greater portion exceeds a first threshold;

determining whether signal energy of the middle processing section is greater than a second threshold;

determining whether a ratio of average power of the middle processing section to average power of the audio signal segment is greater than a third threshold;

determining whether a ratio of the amplitude value of the peak point of the target frame to a sum of amplitude values at peak points of the audio signal segment is greater than a fourth threshold;

determining whether the roll-off rate of the autocorrelation coefficient of the audio signal segment is greater than a fifth threshold;

determining whether a sound intensity of the middle processing section is greater than a sound intensity of the first processing section and a sound intensity of the second processing section;

determining whether a peak duration of the target frame is shorter than a sixth threshold; and determining the peak point of the target frame as a noise point in the target frame if determination results are all positive; and repairing the target frame to remove the noise point in the target frame.

2. The method of claim 1, wherein repairing the target frame comprises:

estimating, with an estimation algorithm, a normal value at the noise point of the target frame before the target frame is interfered by noise;

replacing an amplitude value at the noise point with the normal value;

performing time-domain smoothing on the target frame to make the target frame continuous in time domain; and performing frequency filtering on the target frame to make the target frame continuous in frequency domain.

3. The method of claim 2, wherein the estimation algorithm comprises any of a linear prediction algorithm and an adjacent sampling point superposition algorithm.

4. The method of claim 1, further comprising:

before inputting sequentially the plurality of audio frames into the cache module:

obtaining an audio signal to-be repaired, wherein the audio signal comprises a recording signal; and framing the audio signal to obtain the plurality of audio frames.

5. The method of claim 1, further comprising:

after repairing the target frame:

outputting the repaired target frame in a preset format, wherein the preset format comprises any of a way format, an mp3 format, and a flac format.

6. A device for audio repair, comprising a processor, a communication interface, an input device, an output device, and a memory, wherein the processor, the communication interface, the input device, the output device, and the memory are coupled to each other, the memory is configured to store a computer program comprising program instructions, and the processor is configured to invoke the program instructions to:

input sequentially a plurality of audio frames into a cache module, the cache module being sequentially composed of a plurality of processing units, a processing unit located at a center of the plurality of processing units being a center processing unit;

assign at least one audio frame contained in the center processing unit as a target frame;

detect a noise point presented as a short-term high-energy pulse in the target frame according to audio characteristics of the plurality of audio frames in the cache module, wherein the processor configured to detect the noise point is configured to invoke the program instructions to:

determine a peak point of the target frame;

obtain, from the cache module, an audio signal segment of a preset length centered on the peak point;

divide the audio signal segment into a plurality of sections, wherein the plurality of sections comprise a first processing section, a second processing section, and a middle processing section between the first processing section and the second processing section, and the middle processing section comprises a first sub-section, a second sub-section, and a center sub-section between the first sub-section and the second sub-section;

extract audio characteristics of the target frame and the plurality of sections respectively, wherein the audio characteristics comprise at least one of a peak value, signal energy, average power, a proportion of local peak, a roll-off rate of an autocorrelation coefficient, a sound intensity, or a peak duration; and determine the noise point in the target frame according to the audio characteristics of the target frame and the plurality of sections, wherein the processor configured to determine the noise point in the target frame is configured to invoke the program instructions to:

determine whether an amplitude value at the peak point of the target frame is greater than an amplitude value at a peak point of the center sub-section and an amplitude value at a peak point of the middle processing section;

determine whether the amplitude value at the peak point of the target frame is greater than an amplitude value at a peak point of the first sub-section and an amplitude value at a peak point of the second sub-section and a greater portion exceeds a first threshold;

determine whether signal energy of the middle processing section is greater than a second threshold;

determine whether a ratio of average power of the middle processing section to average power of the audio signal segment is greater than a third threshold;

determine whether a ratio of the amplitude value of the peak point of the target frame to a sum of amplitude values at peak points of the audio signal segment is greater than a fourth threshold;

determine whether the roll-off rate of the autocorrelation coefficient of the audio signal segment is greater than a fifth threshold;

determine whether a sound intensity of the middle processing section is greater than a sound intensity of the first processing section and a sound intensity of the second processing section;

determine whether a peak duration of the target frame is shorter than a sixth threshold; and determine the peak point of the target frame as a noise point in the target frame if determination results are all positive; and repair the target frame to remove the noise point in the target frame.

7. The device of claim 6, wherein the processor configured to invoke the program instructions to repair the target frame is configured to invoke the program instructions to:

estimate, with an estimation algorithm, a normal value at the noise point of the target frame before the target frame is interfered by noise;

replace an amplitude value at the noise point with the normal value;

perform time-domain smoothing on the target frame to make the target frame continuous in time domain; and perform frequency filtering on the target frame to make the target frame continuous in frequency domain.

8. The device of claim 7, wherein the estimation algorithm comprises any of a linear prediction algorithm and an adjacent sampling point superposition algorithm.

9. The device of claim 6, wherein the processor is further configured to invoke the program instructions to:

obtain an audio signal to-be repaired, wherein the audio signal comprises a recording signal; and frame the audio signal to obtain the plurality of audio frames.

10. The device of claim 6, wherein the processor is further configured to invoke the program instructions to:

output the repaired target frame in a preset format, wherein the preset format comprises any of a way format, an mp3 format, and a flac format.

11. A computer-readable storage medium storing a computer program, the computer program comprising program instructions which, when executed by a processor, cause the processor to:

input sequentially a plurality of audio frames into a cache module, the cache module being sequentially composed of a plurality of processing units, a processing unit located at a center of the plurality of processing units being a center processing unit;

assign at least one audio frame contained in the center processing unit as a target frame;

detect a noise point presented as a short-term high-energy pulse in the target frame according to audio characteristics of the plurality of audio frames in the cache module, wherein the program instructions executed by the processor to detect the noise point are executed by the processor to:

determine a peak point of the target frame;

obtain, from the cache module, an audio signal segment of a preset length centered on the peak point;

divide the audio signal segment into a plurality of sections, wherein the plurality of sections comprise a first processing section, a second processing section, and a middle processing section between the first processing section and the second processing section, and the middle processing section comprises a first sub-section, a second sub-section, and a center sub-section between the first sub-section and the second sub-section;

extract audio characteristics of the target frame and the plurality of sections respectively, wherein the audio characteristics comprise at least one of a peak value, signal energy, average power, a proportion of local peak, a roll-off rate of an autocorrelation coefficient, a sound intensity, or a peak duration; and determine the noise point in the target frame according to the audio characteristics of the target frame and the plurality of sections, wherein the program instructions executed by the processor to determine the noise point are executed by the processor to:

determine whether an amplitude value at the peak point of the target frame is greater than an amplitude value at a peak point of the center sub-section and an amplitude value at a peak point of the middle processing section;

determine whether the amplitude value at the peak point of the target frame is greater than an amplitude value at a peak point of the first sub-section and an amplitude value at a peak point of the second sub-section and a greater portion exceeds a first threshold;

determine whether signal energy of the middle processing section is greater than a second threshold;

determine whether a ratio of average power of the middle processing section to average power of the audio signal segment is greater than a third threshold;

determine whether a ratio of the amplitude value of the peak point of the target frame to a sum of amplitude values at peak points of the audio signal segment is greater than a fourth threshold;

determine whether the roll-off rate of the autocorrelation coefficient of the audio signal segment is greater than a fifth threshold;

determine whether a sound intensity of the middle processing section is greater than a sound intensity of the first processing section and a sound intensity of the second processing section;

determine whether a peak duration of the target frame is shorter than a sixth threshold; and determine the peak point of the target frame as a noise point in the target frame if determination results are all positive; and repair the target frame to remove the noise point in the target frame.

12. The computer-readable storage medium of claim 11, wherein the program instructions executed by the processor to repair the target frame are executed by the processor to:

estimate, with an estimation algorithm, a normal value at the noise point of the target frame before the target frame is interfered by noise;

replace an amplitude value at the noise point with the normal value;

perform time-domain smoothing on the target frame to make the target frame continuous in time domain; and perform frequency filtering on the target frame to make the target frame continuous in frequency domain.

13. The computer-readable storage medium of claim 12, wherein the estimation algorithm comprises any of a linear prediction algorithm and an adjacent sampling point superposition algorithm.

14. The computer-readable storage medium of claim 11, wherein the program instructions are further executed by the processor to:

obtain an audio signal to-be repaired, wherein the audio signal comprises a recording signal; and frame the audio signal to obtain the plurality of audio frames.

* * * * *